Aug. 28, 1956

F. R. SHOAF 2,760,697

HOSIERY EVERTING APPARATUS

Filed Dec. 20, 1954

8 Sheets-Sheet 1

FLOYD R. SHOAF,
INVENTOR

BY Eaton & Bell

ATTORNEYS

Aug. 28, 1956 F. R. SHOAF 2,760,697

HOSIERY EVERTING APPARATUS

Filed Dec. 20, 1954

8 Sheets-Sheet 2

INVENTOR:
FLOYD R. SHOAF

BY Eaton & Bell

ATTORNEYS

Aug. 28, 1956 F. R. SHOAF 2,760,697

HOSIERY EVERTING APPARATUS

Filed Dec. 20, 1954 8 Sheets-Sheet 3

INVENTOR:
FLOYD R. SHOAF.

By Eaton + Bell

ATTORNEYS

Aug. 28, 1956 F. R. SHOAF 2,760,697

HOSIERY EVERTING APPARATUS

Filed Dec. 20, 1954 8 Sheets-Sheet 4

INVENTOR:
FLOYD R. SHOAF

BY Eaton + Bell

ATTORNEYS

Aug. 28, 1956 F. R. SHOAF 2,760,697

HOSIERY EVERTING APPARATUS

Filed Dec. 20, 1954 8 Sheets-Sheet 5

FLOYD R. SHOAF,
INVENTOR

BY Eaton + Bell

ATTORNEYS

FLOYD R. SHOAF,
INVENTOR

BY Eaton & Bell

ATTORNEYS

FLOYD R. SHOAF,
INVENTOR

BY Eaton + Bell

ATTORNEYS

United States Patent Office 2,760,697

Patented Aug. 28, 1956

2,760,697

HOSIERY EVERTING APPARATUS

Floyd R. Shoaf, Concord, N. C.

Application December 20, 1954, Serial No. 476,461

11 Claims. (Cl. 223—42)

This invention relates to apparatus for turning or everting soft, pliable or limp tubular articles, such as full-fashioned hosiery and the like and, more especially, the present invention is concerned with improvements in apparatus of the type disclosed in my co-pending application, Serial Number 387,602, filed October 22, 1953, and entitled Hosiery Turner and Method, of which the present application is a continuation-in-part.

The apparatus disclosed in said co-pending application comprises an elongated hose receiving member having a convex upper surface, about one end of which the welt or open end of each successive hose is manually positioned, whereupon a control element is actuated to cause a hose donning device, having a curved lower surface, to resiliently engage and press the exterior of the welt of the hose against the upper surface of the hose receiving member and to draw the hose onto the hose receiving member. The welt is then automatically released from the donning device whereupon a toe punching device punches the toe of the hose into an aperture in the free end or nose of the hose receiving member. Grippers, carried by a hose doffing and everting device, then grasp the closed end portion or toe of the hose and then move longitudinally of the hose receiving member, adjacent its lower surface, to thereby pull the hose inside out while simultaneously drawing the hose off the nose of the hose receiving member. The hose doffing and everting device then automatically releases the hose therefrom to permit the hose to move downwardly by gravity for stacking successive hose in elongated, substantially parallel relationship.

In said co-pending application, the hose donning device and the hose doffing and everting device are mounted upon respective threaded shafts and movement and operation of said devices is effected by rotating the respective threaded shafts. This has necessarily required a relatively complicated mechanism incorporated in each of said devices which mechanism is, consequently, relatively expensive to manufacture and maintain.

It is, therefore, an object of this invention to provide an apparatus of the character described which is more simple in its construction, may be more economically manufactured and maintained and which operates more efficiently than the apparatus disclosed in said co-pending application.

Features of the present invention include the use of endless elements in the form of sprocket chains for imparting movement to the respective donning and everting devices, improved quick-acting gripper control means on the hosiery doffing and everting device, improvements in the hose donning device, including a novel control means therefor, and a simplified means for controlling operation of the toe punching device.

Some of the objects of the invention having been stated, other objects will appear as the description proceeds when taken in connection with the accompanying drawings, in which—

Figure 6:
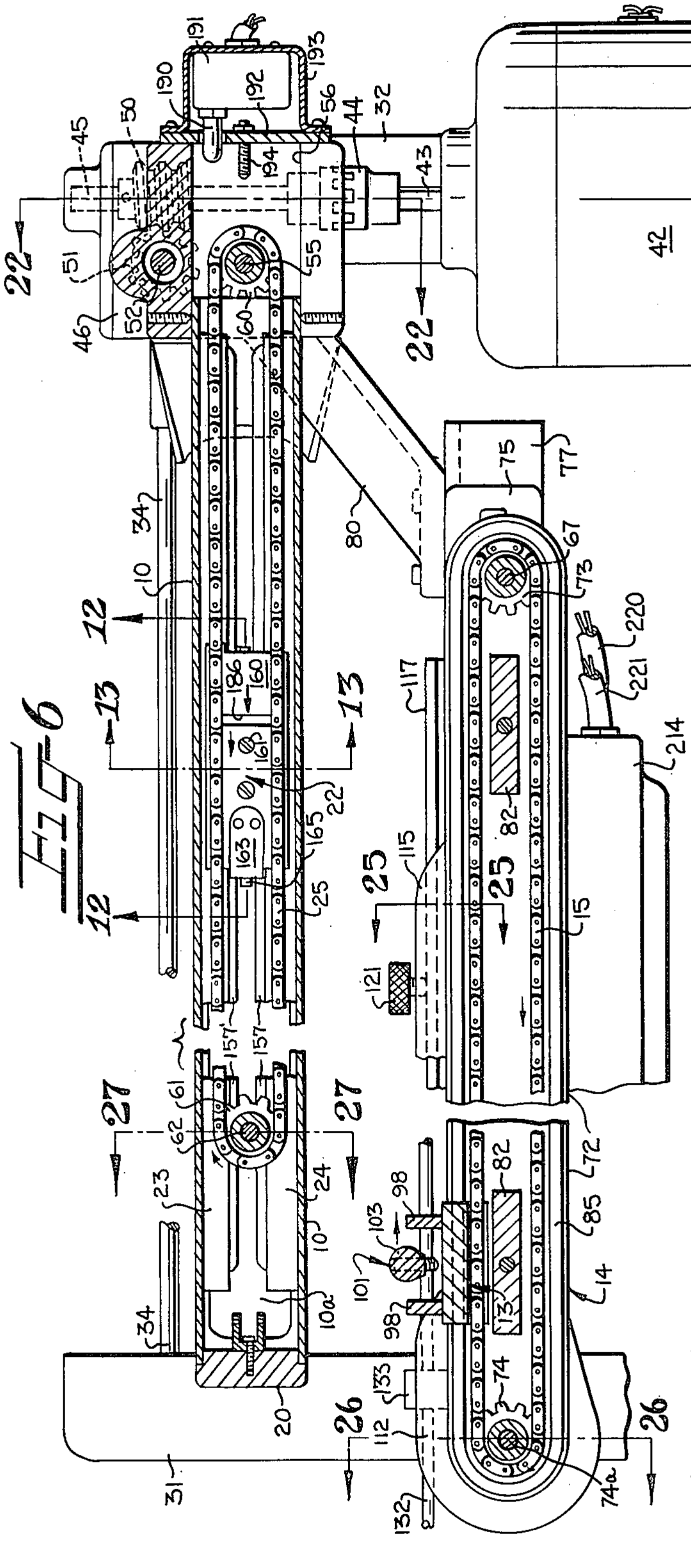
Figure 6 is an enlarged sectional plan view taken substantially along line 6—6 in Figure 2 but showing the hose donning device in a different position from that shown in Figure 2.
Figure 7:
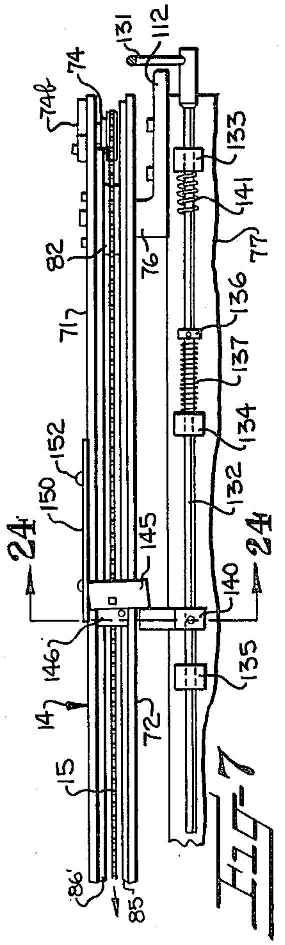
Figure 7 is an enlarged fragmentary elevation taken substantially along line 7—7 in Figure 1, but showing the toe punching device partially in section and in a different position from that shown in Figure 1.
Figure 23:
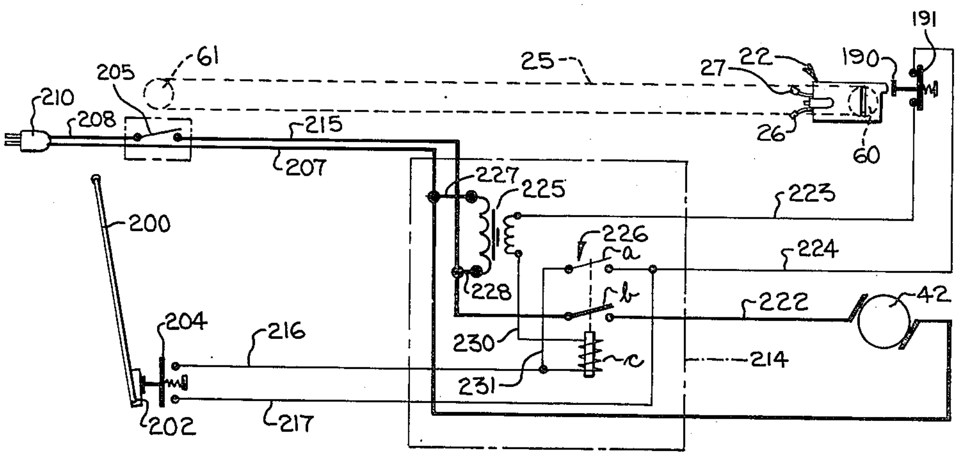
Figure 22:
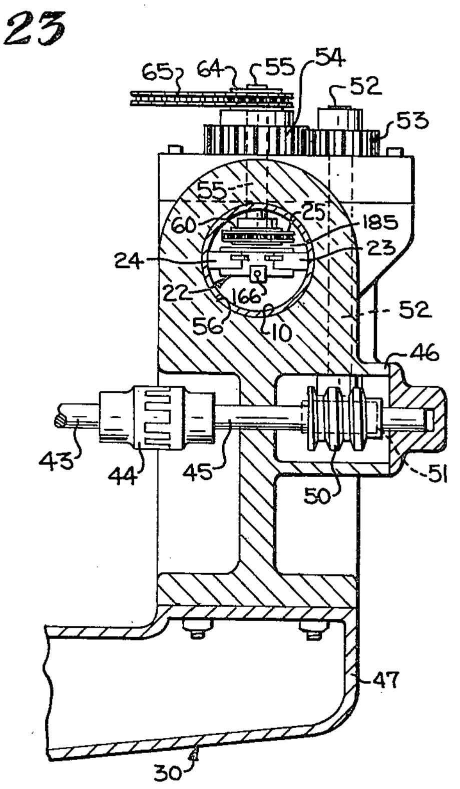
Figure 25:
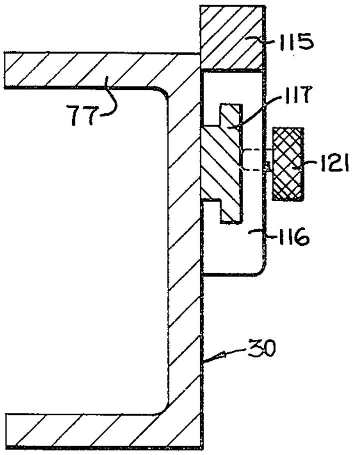
Figure 24:
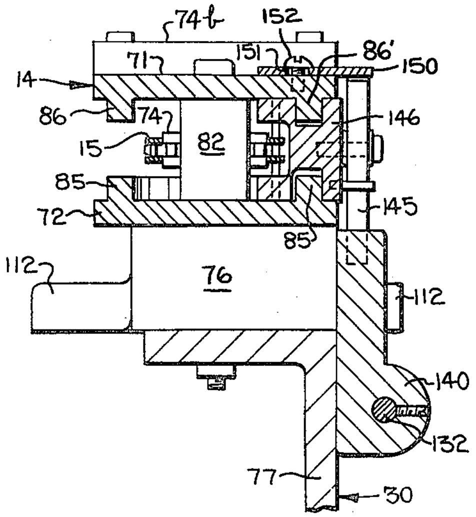
Figures 26, 27:
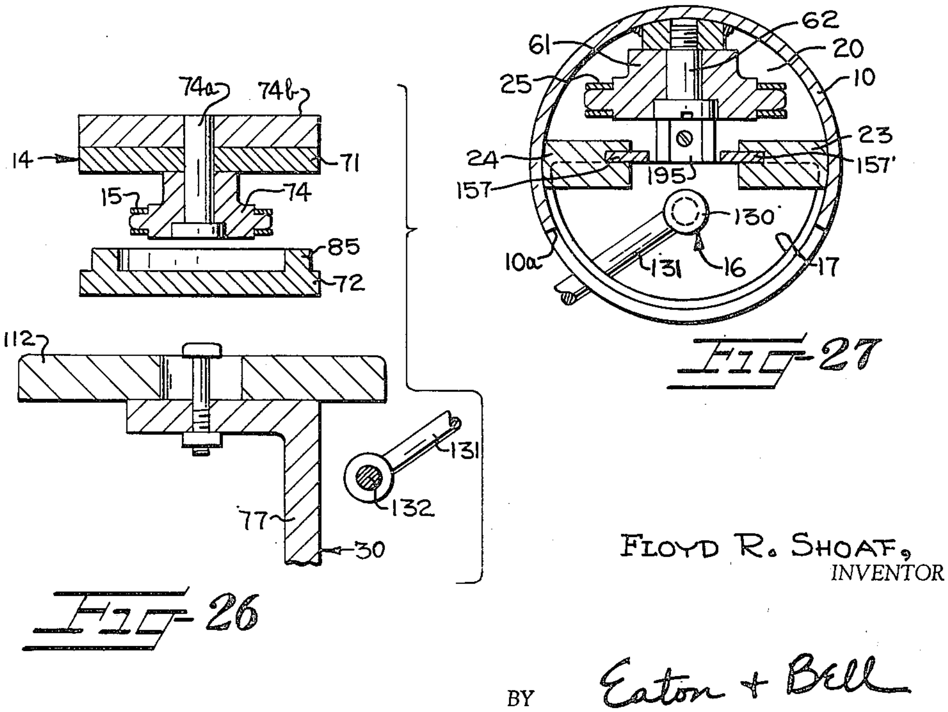

Figures 16 to 21, inclusive, are schematic illustrations showing successive steps in a cycle in the operation of the improved hosiery turning apparatus;

Figure 22 is a vertical sectional view taken substantially along line 22—22 in Figure 6;

Figure 23 is a schematic diagram of the electrical circuit for the improved apparatus;

Figure 24 is an enlarged transverse vertical sectional view through the track assembly taken substantially along line 24—24 in Figure 7 and showing the means for actuating the toe punching device;

Figure 25 is an enlarged fragmentary transverse vertical sectional view taken substantially along line 25—25 in Figure 6 showing the donning device releasing cam;

Figure 26 is an enlarged fragmentary transverse vertical sectional view taken substantially along line 26—26 in Figure 6;

Figure 27 is an enlarged fragmentary vertical sectional view taken substantially along line 27—27 in Figure 6, showing how the front sprocket wheel is mounted in the hose receiving member.

*General description of apparatus*

Referring more specifically to the drawings, the improved article everting apparatus comprises an elongated substantially horizontally disposed hose receiving member 10 which is generally tubular or channel-shaped. As a matter of fact, the hose receiving member 10 is made from a tube which is circular in cross-section and whose lower portion is cut away substantially throughout its length to provide an opening or groove 10*a* in the lower portion thereof through which each successive everted article may pass, as will be more fully described hereinafter. The free end or nose of the hose receiving member 10 is adapted to receive the welt or open end portion W of an elongated tubular pliable article A, which shall be hereinafter termed as a hose or stocking. As the welt or open end portion W is positioned on the free end or nose of the hose receiving member 10, the operator closes a switch 204 which starts the machine, whereupon an arcuate resilient member or presser foot 11 of a hose donning device, broadly designated at 12, then moves around the free front end of an elongated track assembly 14 and then moves rearwardly. In so doing, the presser foot 11 swings downwardly and presses the upper portion of the welt W against the curved or convex upper surface of the hose receiving member 10.

The donning device 12 is carried by a donning carriage, broadly designated at 13, which is mounted for reciprocatory movement parallel to the elongated hose receiving member 10 on the track assembly 14 and wherein the carriage 13 is connected to an endless pliable element shown in the form of a sprocket chain 15 whose laterally spaced runs or reaches extend longitudinally of the track assembly 14. Chain 15 is driven in such a manner that, upon each cycle in the operation of the apparatus, the carriage 13 moves from left to right or rearwardly in Figures 1, 2 and 6 to frictionally draw the hose or article A onto the receiving member 10.

Figure 1:
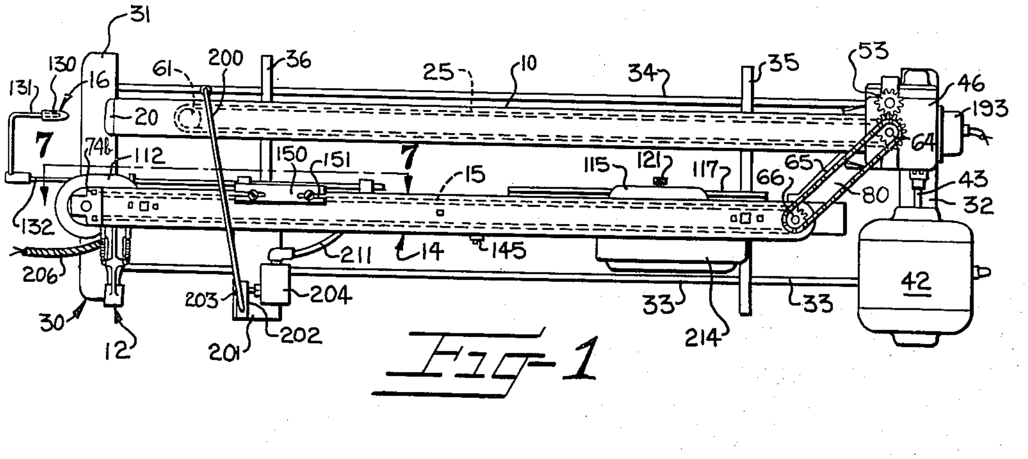
Figure 1 is a top plan view of the improved hosiery everting apparatus.
Figure 2:
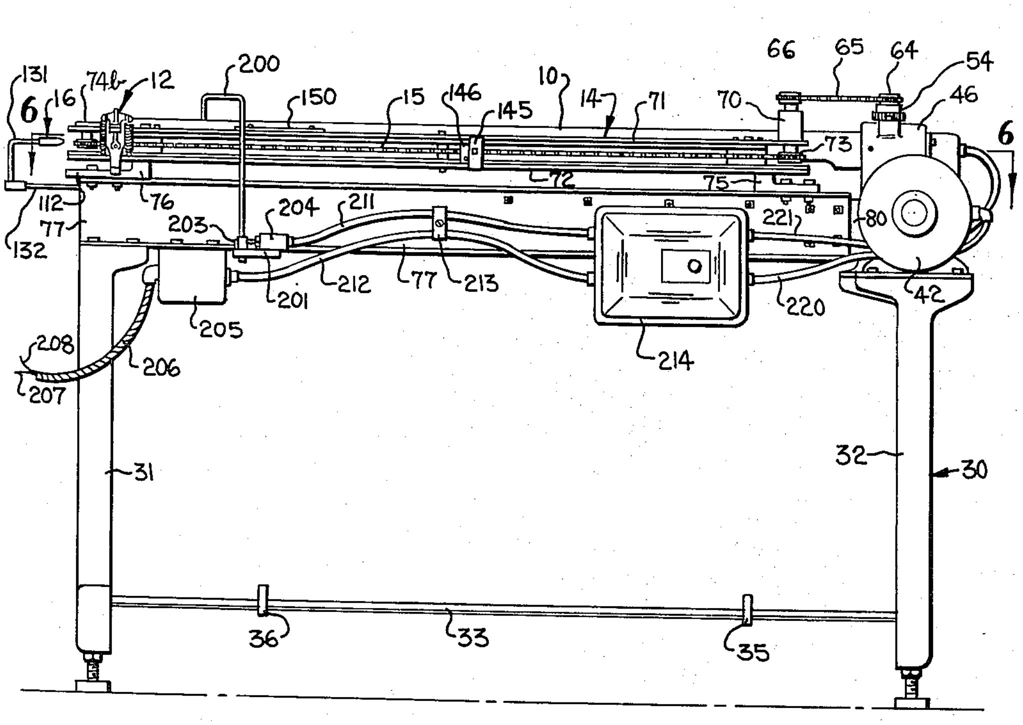
Figure 2 is a side elevation looking at the lower side of Figure 1.
Figure 17:
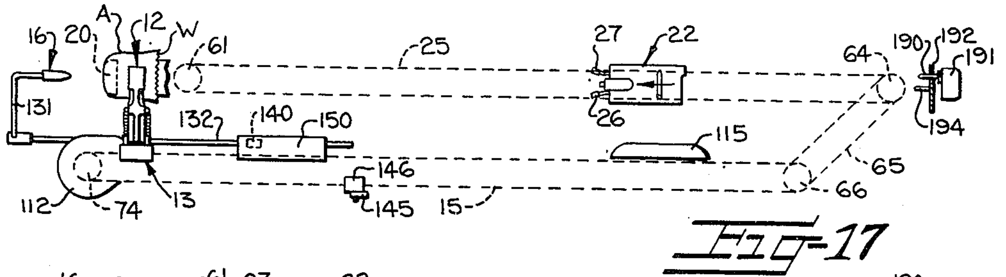
Figure 18:
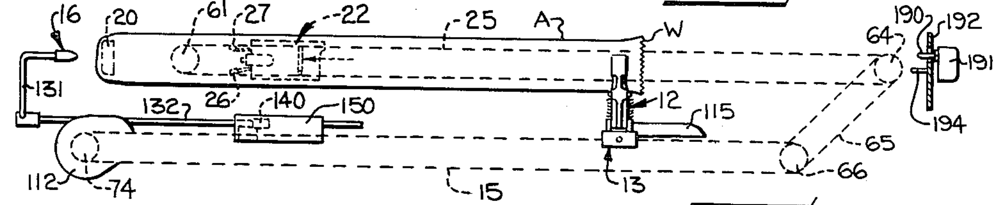
Figure 19:
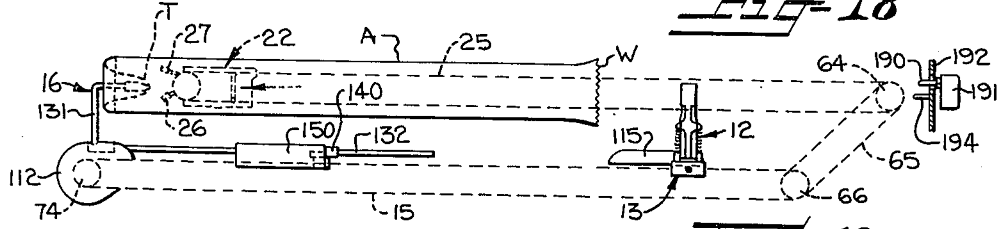

When the donning device 12 has moved a predetermined distance from left to right in Figures 1, 2 and 6, or from the position shown in Figure 17 to substantially the position shown in Figure 18, which may be termed as an active stroke thereof, the donning device 12 is raised out of engagement with the welt W to release the hose A therefrom and continues to move from left to right as shown in Figure 19.

At substantially the time the hose donning device 12 moves out of engagement with the welt W of the article A, the free end of a toe punching device or plunger 16 is moved rearwardly from its normal position spaced from the free end of the hose receiving member 10 and forces a portion of the closed end or toe T (Figures 19, 20 and 21) of the hose A through a substantially crescent-shaped aperture or opening 17 formed in a cap, nose member or plate 20 mounted on the free front end of the hose receiving member 10.

Figures 8, 9, 10, 11:
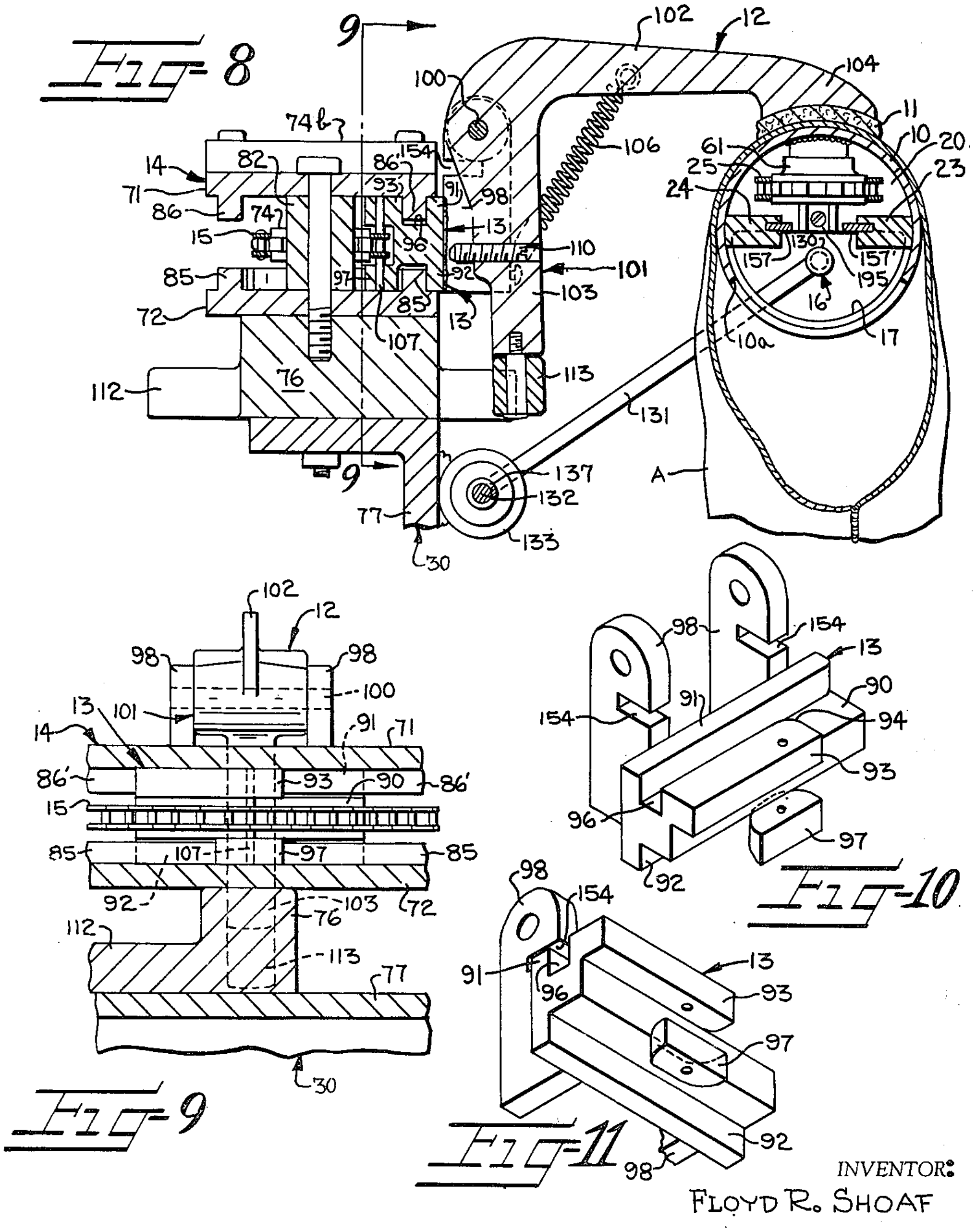
Figure 8 is an enlarged transverse vertical sectional view taken substantially along line 8—8 in Figure 3.
Figure 9 is a fragmentary vertical sectional view taken substantially along line 9—9 in Figure 8.
Figure 10 is an isometric view looking at the top and one end of the carriage for the hose donning device, removed from the machine.
Figure 11 is an isometric view looking up at the bottom and one end of the donning carriage shown in Figure 10.

As the hose donning device 12 starts its movement from inoperative position (Figure 16) to operative position (Figures 8 and 17) an inactive or forward stroke is imparted to a hose doffing and everting device or carriage broadly designated at 22. The hose doffing and everting carriage 22 is mounted for longitudinal movement within the hose receiving member 10 on laterally spaced longitudinally extending tracks 23, 24 suitably secured to the inner surface of the hose receiving member 10 (Figures 6 and 8). Reciprocatory movement is imparted to the doffing and everting carriage 22 by suitable connections, to be later described, with an endless pliable element shown in the form of a sprocket chain 25 whose opposite runs extend longitudinally of and within the hose receiving member 10.

The hose doffing and everting carriage has a pair of relatively movable toe gripping jaws 26, 27 mounted thereon (Figures 12, 14 and 17–21, inclusive) which approach the cap 20 adjacent the free front end of the hose receiving member 10, substantially as shown in Figure 19, as the hose doffing and everting carriage 22 reaches the end of its inactive stroke. At this time, the toe punching device 16 will have forced the toe T through the opening 17 and the jaws 26, 27 then suddenly move from open to closed position to clamp the end of the toe T therebetween. The doffing and everting carriage then reverses its direction of movement to move in an active stroke, during the course of which the hose A is drawn through the opening 17 in cap 20. It is apparent that the hose A is then drawn off the hose receiving member 10 and everted by the doffing and everting device 22 as shown in Figure 20.

Figure 20:
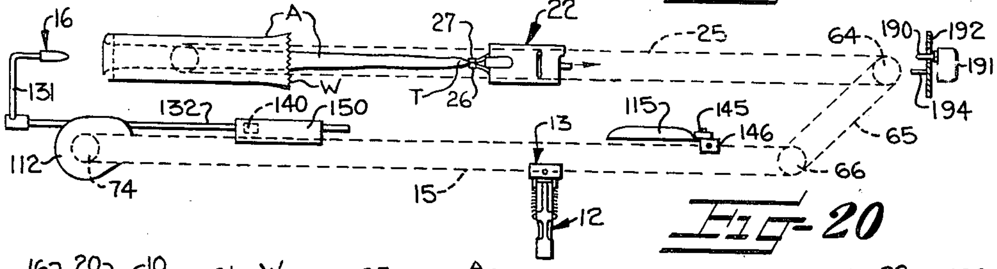
Figure 21:
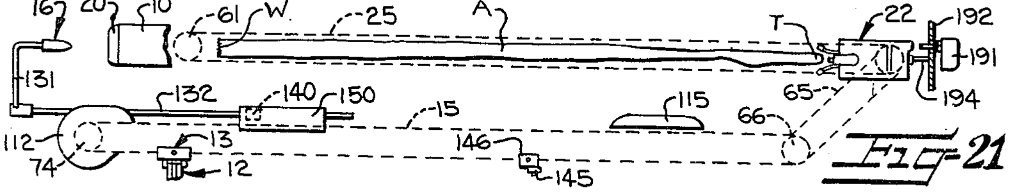

As the hose doffing and everting carriage 22 approaches the end of its active stroke from left to right in Figures 20 and 21, the jaws 26, 27 are automatically opened to release the toe of the hose therefrom, at which time the hose will have been completely withdrawn or doffed from the hose receiving member 10 and the welt W is substantially simultaneously drawn through the opening 17 so the hose is released from the hose everting apparatus in its elongated natural state and falls, by gravity, from the hose receiving member 10. Also, as the doffing and everting carriage 22 approaches the end of each successive active stroke, mechanism is operated to stop further movement of the chains 15, 25, at which time the donning device 12, the hose doffing and everting device 22 and the toe punching device 16 comes to rest in substantially the positions shown in Figures 1, 2, 4, 5 and 16 to complete a cycle in the operation of the improved hosiery everting apparatus.

*Detailed description of hosiery everting apparatus*

Referring more specifically to Figures 1 to 9, inclusive, the numeral 30 broadly designates a frame comprising spaced front and rear standards or end frame members 31, 32 whose lower portions have the front and rear ends of laterally spaced, longitudinally extending lower frame members or rods 33, 34 suitably secured thereto whose medial portions are spanned by a pair of transverse frame members 35, 36 on which a suitable article receiving container or basket 37 may be supported for receiving each successive everted article or hose A to form a stack of articles or hosiery therein. A suitable supply basket or container 40 may also be suitably attached to the upper portion of the front frame member 31 below the free end of the hosiery receiving member 10 for containing a supply of the hose to be everted and for also supporting the lower portions of the hose as the welts W thereof are initially positioned about the free end of the hose receiving member 10 in order that the hose will not fall off the hose receiving member 10 during the interim between the time that the welts thereof are initially positioned above the free end of the hose receiving member 10 and the time at which the hose donning device 12 is moved into operative position for clamping the hose against the upper surface of the hose receiving member 10, in the manner heretofore described.

It will be noted that the end frame members 31, 32 are substantially L-shaped with the vertical legs thereof being disposed to one side of the vertical plane of the hose receiving member 10 in order that the free end of the hose receiving member 10 is readily accessible to the operator.

An electric motor 42 is fixed on the upper end of the rear end frame member 32 and has a motor shaft 43 extending therefrom which is coupled, as at 44 (Figures 6 and 22), to a shaft 45 journaled in the lower portion of a gear housing 46 suitably secured to the upper surface of a laterally extending arm 47 on the upper portion of the frame member 32. The shaft 45 has a worm 50 fixed thereon which meshes with a worm gear 51 fixed on a vertically disposed shaft 52 which is also suitably journaled in the housing 46. The upper end of shaft 52 projects above the housing 46 and has a gear 53 fixed thereon which meshes with a gear 54 (Figures 1, 2, 3, 4 and 5) fixed on the upper portion of a vertically disposed shaft 55 whose lower portion is also suitably journaled in the gear housing 46.

It will be observed in Figures 6 and 22 the lower portion of the vertical shaft 55 extends into a forwardly and rearwardly extending slot or bore 56 formed in the housing 46. The rear end of the hose receiving member 10 is fixed in the bore 56 and the lower portion of shaft 55 has a sprocket wheel 60 fixed thereon within the bore 56. Sprocket wheel 60 is engaged by the rear portion of the endless sprocket chain 25, the front portion of the sprocket chain 25 being mounted on a sprocket wheel 61 rotatably mounted on the lower end of a vertical stub shaft 62 whose upper end is suitably secured to the upper portion of the wall of the hose receiving member 10 (Figure 27). It should be noted that the sprocket chain 25 is spaced above the laterally spaced tracks 23, 24 within the hose receiving member 10.

The upper end of the vertically disposed shaft 55 has another sprocket wheel 64 fixed thereon which is engaged by a sprocket chain 65 which also engages a sprocket wheel 66 fixed on the upper end of a vertically disposed shaft 67. The shaft 67 is journaled in a bearing block 70 fixed to the upper surface of an elongated upper track plate 71 of the track assembly 14, which plate 71 is spaced above an elongated lower track plate 72. The lower end of shaft 67 loosely extends through the upper track plate 71 and terminates above the lower track plate 72 and has a sprocket wheel 73 fixed thereon on which the endless sprocket chain 15 is mounted. The front portion of sprocket chain 15 is also mounted on a sprocket wheel 74 rotatably mounted on the lower end of a stub shaft **74*a* whose upper end is fixed in a block 74*b* suitably secured to the front portion of the upper plate 71 of the track assembly 14** (Figure 26).

Figures 4, 5:
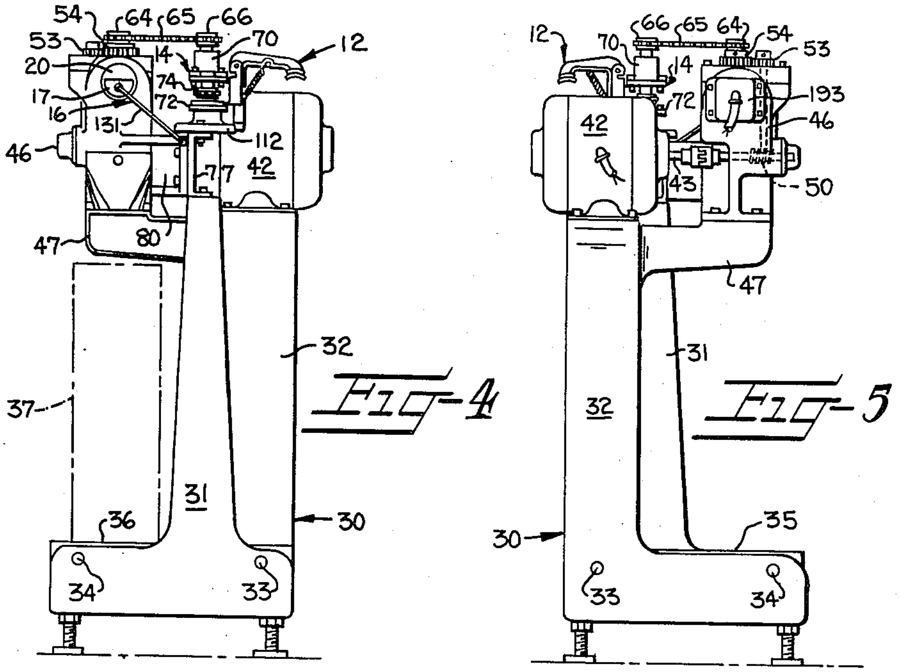
Figure 4 is a front elevation of the apparatus looking at the left hand side of Figure 2 showing a hose-receiving container, in phantom lines, mounted on the machine.
Figure 5 is a rear elevation of the apparatus looking at the right-hand side of Figure 2.
Figure 3:
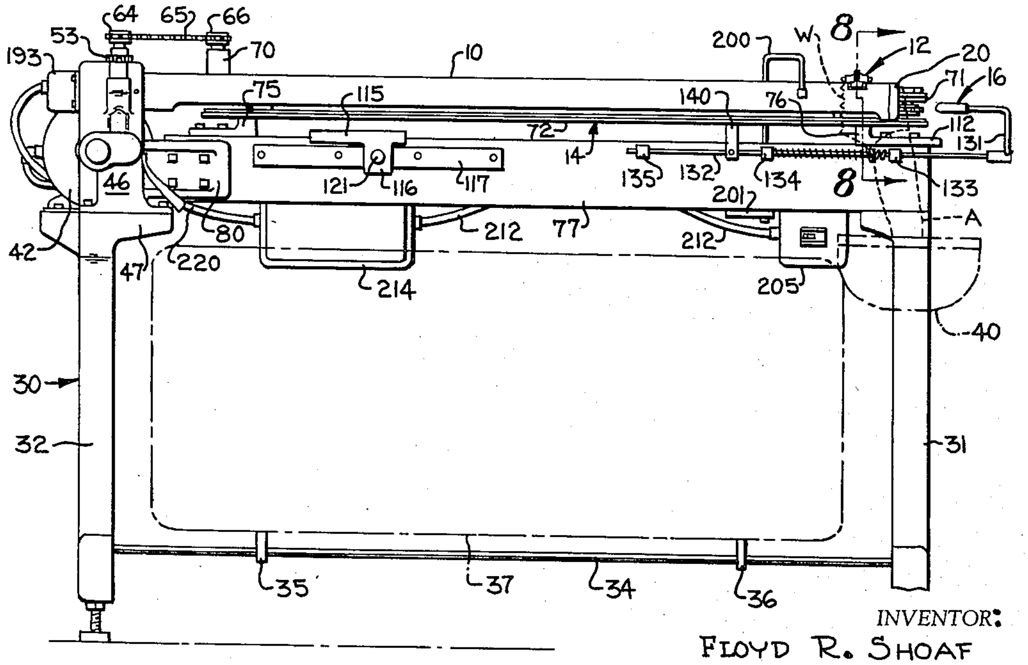
Figure 3 is a view looking at the opposite side of the apparatus from that shown in Figure 1, but showing the hose donning device in a different position from that shown in Figure 2 and also showing a pair of containers, in phantom lines from which the hose are removed prior to the everting operation and into which each successive hose falls at the completion of a hose everting operation.

Opposite end portions of the track plate 72 are fixed to suitable brackets 75, 76 fixed to the upper surface of an elongated upper frame member 77 shown in the form of a channel bar in Figure 4. The front end of channel bar 77 is suitably secured to the upper surface of the vertical leg of the front end frame member 31 and the rear end of the channel bar 77 is suitably secured to the front end of an arm 80 (Figure 6) which extends rearwardly and outwardly at an angle and is formed integral with or suitably secured to the gear housing 46. Disposed above each of the brackets 75, 76 and engaging the upper surface of the lower track plate 72 of the track assembly 14 is a spacing block 82 to the upper end of which opposite end portions of the upper track plate 71 are suitably secured thereby maintaining the track plates 71, 72 in fixed vertically spaced relationship parallel to the hose receiving member 10.

*Hose donning device*

Referring to Figure 6, in particular, it will be observed that the bottom track plate 72 has an endless track thereon in the form of an endless rib projecting upwardly therefrom, the distance between opposed runs thereof being slightly greater than the distance between the distal surfaces of opposed runs of the sprocket chain 15. It will also be observed that the inner radii of opposite end portions of the endless track 85 are also slightly greater than the outer radii of the corresponding portions of the sprocket chain 13 passing in engagement with the respective sprocket wheels 73, 74. The upper track plate 72 also has a pair of laterally spaced, longitudinally extending tracks 86, 86′ thereon which are spaced above and extend parallel to opposed longitudinal reaches of the lower track 85. Opposite ends of the tracks 86, 86′ necessarily terminate short of the curved opposite end portions of the track 85.

The hose donning carriage 13 is in the form of an elongated bar or block 90 (Figures 8 to 11, inclusive) adapted to move freely between the lower track 85 and the upper tracks 86, 86′ and which has an enlarged outer portion forming upper and lower flanges 91, 92 thereon which are adapted to ride against the outer surface of the lower track 85 and the outer surfaces of the upper tracks 86, 86′, respectively. The block 90 also has an elongated inwardly projecting portion 93 thereon which terminates short of the leading end of the block or bar 90 and is preferably rounded thereat as at 94. The inner surface of portion 93 is adapted to ride against the inner surfaces of the upper tracks 86, 86′ and, thus, the flange 91 and the projection 93 define a groove 96 therebetween in which the tracks 86, 86′ are alternately disposed during inactive and active strokes of the carriage 13.

The bar 90 also has a relatively short inwardly projecting portion 97 on the lower medial portion thereof whose inner surface is rounded somewhat and which is adapted to ride against the inner surface of the lower track 85. This small projection 97 is particularly provided to guide the carriage 13 during the course of movement of said carriage about the rounded or semicircular opposite end portions of the track 85. Secured to the outer wall formed by the flanges 91, 92 is a pair of upright members or bearing blocks 98 in which opposite ends of a pivot shaft 100 are mounted and on which pivot shaft a bell crank 101, including substantially right-angularly arranged arms 102, 103, is oscillatably mounted.

The bell crank 101 is a primary part of the hose donning device 12 and it will be noted that the free end of the arm 102 thereof has a projection or presser foot portion 104 thereon provided with a curved surface to which the curved resilient member 11 is suitably secured. The arm 102 of said bell crank 101 is normally urged toward the hose receiving member 10 or in a clockwise direction in Figure 8 by a pair of tension springs 106 whose upper ends are connected to the medial portion of the arm 102 adjacent opposite sides thereof and whose lower ends are connected to the lower portions of the bearing blocks 98 of the carriage 13. The carriage 13 is connected to the sprocket chain by means of a pin 107 (Figure 8) which penetrates one of the links of the sprocket chain 15 and whose upper and lower ends are fixed in the projections 93, 97 on the block 90, between which projections the sprocket chain 15 extends.

It is thus seen that, when the sprocket chain 15 is driven in a clockwise direction in Figure 6, corresponding movement is imparted to the carriage 13 and the donning device 12. In order to limit downward movement of the resilient presser foot 11 on the free end of the bell crank arm 102 of the donning device 12, when the resilient presser foot 11 is not in engagement with the upper surface of the hose receiving member 10 or the article therebetween, it will be observed in Figure 8 that the medial portion of the substantially vertical arm 103 of bell crank 101 has an adjustment screw 110 threadably mounted therein which then engages the outer surface of the wall 91, 92 of the carriage block 90.

As heretofore stated, when the hosiery everting apparatus is at a standstill, the hose donning device 12 occupies substantially the position shown in Figures 1, 2, 4, 5 and 16, at which time the hose donning device 12 projects outwardly from the carriage 13 relative to the track assembly 14; that is, the donning device 12 projects outwardly away from the hose receiving member 10. As each cycle in the operation of the apparatus is initiated, the hose donning device 12 is moved upwardly at its free end and maintained in raised position throughout the movement of the carriage 13 in engagement with the rounded front portion of the track 85, by means of a cam 112 which, in this instance, is formed integral with the bracket 76.

Figure 16:
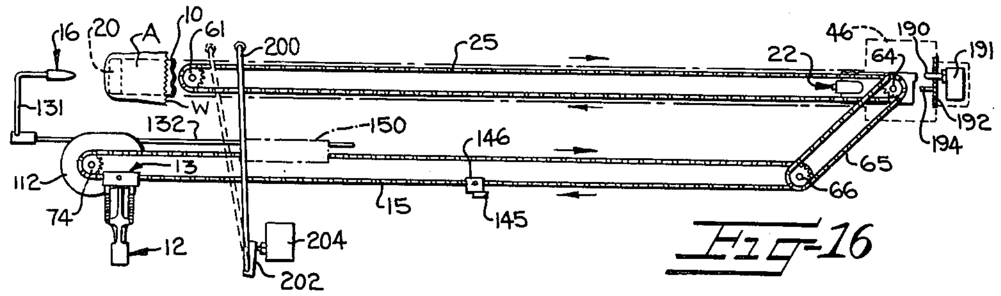

It will be observed in Figure 8 that the lower end of the bell crank arm 103 has a cam follower 113 thereon which, upon movement of the carriage 13 and hose donning device 12 in an inactive stroke from right to left in Figures 1 and 16, engages the outer edge of the cam 12 and raises the free end of the bell crank arm 102 a predetermined amount. It will be observed in Figures 1, 16 and 17, that the cam 112 is so formed as to maintain the free end of the crank arm 102 in raised position until it has moved entirely around the free front end of the track 85 and until the cushion member 11 on the free end of the arm 102 has moved rearwardly beyond the nose 20 on the free front end of the hose receiving member 10. Thus, assuming that the welt or open end of an article A has been previously positioned about the free end of hose receiving member 10, as the cam follower 113 moves out of engagement with the cam 112, the springs 106 then cause the cushion element 11 to resiliently or frictionally engage and impart rearward movement to the welt of the article A (Figure 17).

Spaced rearwardly of the cam 112 is a second elongated cam or cam bar 115 which is spaced a predetermined distance from the cam 112 or from the free front end of the hose receiving member 10 and which is adapted to be engaged by the follower 113 (Figure 8) on the lower end of bell crank arm 103 for raising the resilient presser foot 11, on the crank arm 102 of the hose donning device 12, out of engagement with the welt after a predetermined length of the article or hose A has been drawn onto the hose receiving member 10. The cam 115 is of sufficient length to insure that the hose donning device 12 has moved rearwardly beyond the welt prior to again being permited to move downwardly.

With further rearward movement of the hose donning device 12, the hose donning device 12 then moves about rounded rear portion of the lower track 85, or the rounded rear portions of the track bars 71, 72, in the course of which the resilient presser foot 11 on the arm 102 of the donning device 12 slides off the hose receiving member 10 and, as heretofore stated, the crank arm 102 is then prevented from moving downwardly excessively by the set screw 110.

The second release cam 115 may be suitably secured to the upper longitudinally extending frame member 77 of the frame 10 in any desired manner and, since the apparatus is devised to accommodate hose of varying lengths, the cam 115 is adjustably supported on the frame 10. In this instance, the cam 115 has a downwardly projecting portion 116 thereon (Figures 3 and 25) which is guided on a guide bar 117 suitably secured to the inner surface of the channel bar 77. The portion 116 is threadably penetrated by a set screw 121 which bears against the outer surface of the guide bar 117 to thereby secure the cam 115 in the desired adjusted position.

*Toe punching device*

The toe punching device 16 comprises a smoothly rounded toe punching tip 130 which is fixed to the rearwardly projecting free end of a rod 131 which free end is normally disposed in spaced alinement with the opening 17 in the cap or nose member 20 on the front end of the hose receiving member 10. Referring to Figures 7 and 8, it will be observed that the rod 131 extends downwardly at an angle and is fixed on the free front end of a shaft or rod 132 loosely mounted in spaced guide blocks 133, 134, 135 (Figure 7). The bearing blocks 133, 134, 135 are suitably secured to the longitudinally extending upper frame member 77 of the frame 10. The portion of shaft or rod 132 between bearing blocks 133, 134 has a collar 136 fixed thereon and a compression spring 137, surrounding shaft 132, engages collar 136 and bearing block 134 to normally urge the toe punching device 16 forwardly or to inoperative position.

The shaft 132 also has a stop 140 fixed thereon at a point between bearing clocks 134, 135 and extending upwardly therefrom and which is guided against the frame member 77 thereby restraining shaft 132 against rotation. A compression spring 141 also surrounds shaft 132 and serves as a shock absorber when the shaft 132 is released and permits spring 137 to move the toe punching device forwardly.

Spaced substantially from the donning carriage 13, a predetermined distance, is a pivoted dog or latch 145 which is pivotally mounted adjacent its upper end on a dog-supporting bracket or carriage 146 carried by the sprocket chain 15 (Figures 7 and 24). The dog-supporting bracket 146 may be attached to the chain 15 and guided on the tracks 85, 86, 86′ in substantially the same manner as that of the donning carriage 13 and, therefore, a further detailed description and illustration thereof is deemed unnecessary (see Figure 24).

It will be observed in Figures 7 and 24 that the lower portion of the latch or pivoted dog 145 normally depends below the horizontal plane of the upper edge of the stop 140 carried by shaft 132 and, spaced above the shaft 132 is a latch restraining plate 150 having a pair of adjustment slots 151 (Figures 1 and 24) therein which are penetrated by respective screws 152 for adjustably securing said plate 150 to the upper surface of the upper track plate 71. Now, the spring 137 normally urges the shaft 132 forwardly or from left to right in Figure 7, such movement being limited, in this instance, by engagement of collar 136 with the rear end of spring 141.

Thus, as the latch or pivoted dog 145 moves rearwardly or from right to left in Figure 7, at substantially the same time that the follower 113 on the crank arm 103 of the donning device 12 engages cam 115 to release the article from the donning device 12, the lower portion of the pivoted dog or latch 145 engages the stop 140. Since rotative movement of the latch 145 is prevented by engagement of the upper end of the latch 145 in Figure 7 with the lower surface of the restraining plate 150, it is thus seen that, with further rearward movement of the latch 145, corresponding movement is imparted to the rod 132 and thus to the toe punching tip 130 to move the same from the position shown in Figures 1 and 18 to substantially the position shown in Figure 19. In so doing, the toe punching tip 130 enters the aperture 17 in the cap 20 on the front end of the hose receiving member 10 to thereby force the closed end or toe T of the hose or article A into and through said aperture 17. However, as the latch or pivoted dog 145 moves rearwardly beyond the rear edge of restraining plate 150, it is then free to rotate and thus releases the shaft 132 and the spring 137 then returns the toe punching device 16 to its normally inoperative position.

Referring to Figure 1, the restraining plate 150 projects beyond the inner edge of track plate 71 of track assembly 14 and, since the bearing portions 98 of the donning carriage 13 (Figures 8 to 11, inclusive) move closely adjacent the periphery of track plate 71, the bearing portions 98 each has a slot 154 therethrough to accommodate the restraining plate 150.

*Doffing and everting device*

As heretofore stated, as each successive cycle in the operation of the hosiery turner is initiated, the donning device 12 occupies substantially the position shown in Figure 1 and moves in a semi-circular path around the front end of the track assembly 14 and then commences its rearward movement in an active stroke. Also, upon initiation of each successive cycle, the hose doffing and everting device 22 occupies a rearward position and an inactive or forward stroke is imparted thereto simultaneously with operation of the donning device 12 being effected, since movement is imparted to the donning device 12 and the doffing and everting device 22 simultaneously, due to both of the chains 15, 25 being driven simultaneously in the manner heretofore described. It will be noted that opposite ends of the tracks 23, 24 terminate short of opposite ends of the hose receiving member 10.

Operation of the hose donning device 12 and the toe punching device 16, as heretofore set forth, is such that the grippers 26, 27 on the doffing and everting device 22 grip the portion of the toe T of the hose A previously thrust through the opening 17 by the toe punching device 16 immediately prior to movement of the latch 145 out of engagement with the lower surface of the restraining plate 150 (Figure 7).

The hose doffing and everting device 22 is best shown in Figures 6, 12 to 15, inclusive, and Figures 17 to 21, inclusive. The doffing and everting device 22 comprises an elongated bar or body 155 having longitudinally extending grooves 156, 156' on opposite sides thereof which are penetrated by respective auxiliary tracks 157, 157' which are relatively thin as compared to the respective tracks 23, 24 and project inwardly from the proximal medial surfaces of the respective tracks 23, 24. The inner corners at opposite ends of the auxiliary tracks 157, 157' are preferably rounded as shown in Figure 6 to facilitate mounting the body 155 thereon.

Figures 12, 13, 14, 15:
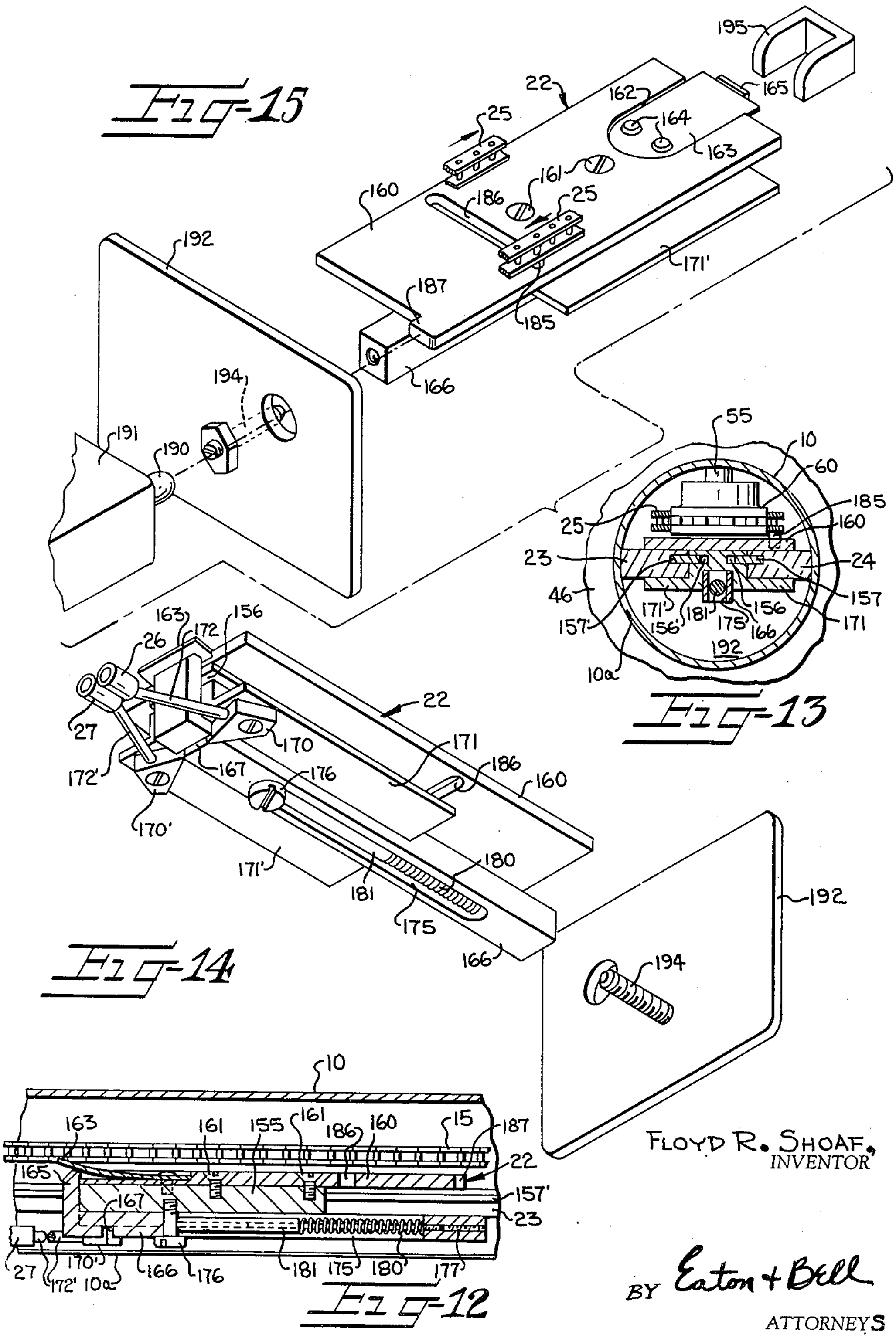
Figure 12 is an enlarged longitudinal vertical sectional view through the hose doffing and everting device taken substantially along line 12—12 in Figure 6, but showing the movable parts thereof in a different position from that shown in Figure 6.
Figure 13 is an enlarged transverse vertical sectional view taken substantially along line 13—13 in Figure 6.
Figure 14 is a partially exploded isometric view looking up at the lower side of the doffing and everting device, showing its relationship to the abutment for cocking the same, but showing the doffing and everting device otherwise removed from the machine.
Figure 15 is a partially exploded isometric view looking at the opposite side and end of the doffing and everting device from that shown in Figure 14 and also looking at the top of the doffing and everting device and showing fragmentary portions of the driving chain therefor in association therewith.

A top plate 160 of substantially greater width and length than the body 155 is suitably secured to the upper surface of said body, as by screws 161, and it will be observed in Figures 12 and 14 that the front end of plate 160 is substantially flush with the front end of the body 155. The top plate 160 overlies and may slidably engage the upper surfaces of the tracks 23, 24. The front upper surface of the top plate 160 is recessed, as at 162 (Figure 15) for reception of a leaf-spring latch member 163 suitably secured at it rear end, as at 164, in the recess 162.

It will be noted that the spring latch member 163 extends forwardly beyond the front edge of top plate 160 and is normally biased upwardly by a projection 165 on the front end of an elongated jaw shifting block or bar 166 mounted for longitudinal sliding movement in the lower portion of the body 155 and having its lower edge projecting below the level of the lower surface of the body 155. The front portion of the jaw shifting element or bar 166 has a transverse slot 167 therein in which the pointed proximal portions of jaw actuating cams 170, 170' are positioned and which cams are pivotally connected to the lower surfaces of lower flanges 171, 171' on the body 155. It should be noted that flanges 171, 171' are spaced below plate 160 and underlie respective tracks 23, 24 (Figure 13).

The jaws 26, 27 are preferably made from a resilient material, such as rubber, leather or the like, and are fixed on the forward ends of jaw levers or arms 172, 172' whose rear ends are fixed in or to the cams 170, 170'. The medial portion of the jaw controlling shifting rod or shifting element 166 has a longitudinally extending slot 175 therein which is loosely penetrated by a screw 176, the head of which supports the jaw shifting element 166 and the upper end of which is threadably embedded in the body 155. The closed rear end of said slot 175 has a guide rod 177 fixed therein and extending longitudinally of the slot 175.

The guide rod 177 is surrounded by a compression spring 180, one end of which bears against the rear wall of said slot 175 and the other end of which bears against a plunger 181 extending axially of and being loosely mounted on the front portion of the rod 177 within the slot 175. The front end of the spring-loaded plunger 181 bears against the screw 176 and normally urges the jaw shifting bar or element 166 rearwardly relative to the body 155 to substantially the position shown in Figures 12, 14 and 20.

As heretofore stated, the sprocket chain 25 is spaced closely above the tracks 23, 24 and one of the links of the sprocket chain 25 has a pin 185 projecting downwardly therefrom which works in a transverse slot 186 formed in the top plate 160 of the doffing and everting carriage 22. It should be noted that the rear end of the jaw shifting plunger or bar 166 extends rearwardly beyond the rear edge of the top plate 160 which top plate, in turn, extends substantially beyond the rear end of the body 155. The rear end of the top plate 160 has a switch-engaging projection 187 on one side thereof which is alined with the spring loaded plunger 190 of a normally closed switch 191 (Figures 6 and 15 to 21, inclusive). The plunger 190 loosely extends through a plate 192 which closes the rear end of the opening or bore 56 in the gear housing 46. A suitable bracket 193, to which the switch 191 is secured, is suitably secured to the closure plate 192 (Figure 6).

A bumper or abutment in the form of an adjustment screw 194 is carried by said closure plate 192. The adjustment screw 194 threadably penetrates said plate 192 and is alined with the jaw controlling or shifting bar 166. Thus, as the doffing and everting device or carriage 22 moves rearwardly in an active stroke, from substantially the position shown in Figure 19 to substantially the position shown in Figure 21, the parts thereof occupy the position shown in Figures 12 and 14 and the jaws 26, 27 are closed. Accordingly, the rear portion of the carriage 22 enters the opening or bore 56 in the gear housing 46 and, in so doing, the rear end of the jaw shifting bar 166 engages the abutment 193. Continued rearward movement of the carriage 22 causes the plate 160 and body 155 to move rearwardly relative to the jaw shifting bar 166. Thus, the free end of the leaf-spring latch member 163 moves forwardly beyond the projection 165 on the front end of the jaw shifting bar 166 and then snaps downwardly and prevents the jaw shifting bar 166 from again moving rearwardly relative to the body 155 until the front end of the leaf-spring latch member 163 is again raised out of engagement with the projection 165 by means to be later described.

It is apparent that, as the body 155 moves rearwardly relative to the jaw shifting bar 166, the jaws 26, 27 are swung apart from each other or to open position to thereby release the toe of the previously grasped hose therefrom. Now, as the top plate 160 and body 155 move rearwardly in the manner heretofore described relative to the jaw shifting bar 166, the projection 187 on the top plate 160 momentarily engages the plunger 190 and opens switch 191 to break the circuit to the electric motor 42. The electrical connections between the switch 191 and the electric motor 42 will be later described.

Although the electric motor 42 is then de-energized, the momentum of motor shaft 43 is such that rotation of the shaft 43 continues after the motor 42 has been de-energized for a sufficient period of time to permit the pin 185 (Figure 15) to transverse the slot 186 in the top plate 160 and to then momentarily impart reverse or forward movement to the doffing and everting carriage 22 for a sufficient amount to insure that the switch 191 is again permitted to close. It might be stated, however, that this subsequent closing of the switch 191 does not again energize the electric motor 42 until the next cycle in the operation of the apparatus is initiated by the operator in a manner to be later described.

As the hose doffing and everting device or carriage 22 approaches the end of each of forward or inactive stroke, it is apparent from the foregoing description that the jaws 26, 27 are then held in open position by the spring latch member 163 engaging the projection 165 on the jaw shifting bar or element 166 as shown in Figures 6 and 15. However, the free front end of the leaf-spring latch member 163 engages and rides upwardly upon the rounded front end of a pair of laterally spaced latch releasing cams 195 which are integral parts of a substantially U-shaped block suitably secured to the inner or rear surface of the cap 20 immediately above the aperture or opening 17 (Figures 8 and 15).

It is apparent that, when the free front end of the latch member 163 is moved upwardly relative to the top plate 160 of the carriage 22, the spring loaded plunger 180 then causes the jaw shifting element or bar 166 to suddenly dart rearwardly relative to the body 155 of the carriage 22 to suddenly and positively close the jaws 26, 27 and to maintain them closed until they are again opened in the manner heretofore described.

*Electrical circuit*

The electrical circuit is shown schematically in Figure 25; however, various electrical components are best shown attached to the frame 10 in Figure 2 wherein it will be observed that an inverted substantially U-shaped start switch control finger or rod 200 is provided and wherein one of the vertical legs thereof is substantially longer than the other vertical leg thereof. The horizontal portion of the switch control element 200 overlies the track assembly 14 and the hose receiving member 10 and its free end portion is spaced substantially from the free front end of the hose receiving member 10 so it may be readily engaged by the hand of the operator as the operator places the welt W of each succeeding hose or article A about the free end of the hose receiving member 10.

It will be observed that the leg of the inverted U-shaped control finger 200 remote from the hose receiving member 10 extends downwardly and is pivotally mounted in a support 201 shown in the form of a plate which extends inwardly and is suitably secured to the lower surface of the longitudinally extending upper frame member 77. The control finger 200 has a switch engaging member or block 202 fixed thereon which is adapted to be moved in sliding engagement with the upper surface of the support 201 and whose free end is limited as to forward movement by an abutment or stop 203 fixed in the support 201. The switch actuating block 202 is normally urged against said stop 203 by the spring loaded plunger of a normally open two-point-make start switch 204 whose housing is also fixed on the support 201.

The housing of a master switch 205 is also fixed to the lower surface of the upper longitudinal frame member 77 forwardly of the support 201 and has one end of a cable 206 connected thereto through which lead wires 207, 208 (Figure 23) extend from a plug 210 adapted to be connected to a suitable source of electrical energy, not shown. The housings of switches 204, 205 have corresponding ends of respective cables 211, 212 connected thereto whose medial portions are suitably attached, as at 213 (Figure 2), to the medial portion of the upper longitudinal frame member 77 and whose rear or other ends are connected to a junction box 214 suitably secured to the upper longitudinal frame member 77. The wire or conductor 207 passes from cable 206, through the housing of switch 205 and thence through the cable 212 to the junction box 214.

The end of wire 208 remote from the plug 210 is connected to one side of switch 205 and the other side of switch 205 has one end of a wire or conductor 215 connected thereto which also extends through the cable 212 into the junction box 214. The switch 204 has corresponding ends of wires or conductors 216, 217 connected thereto which extend through cable 211 and into the junction box 214. The rear wall of junction box 214 (Figure 2) has a pair of cables or conduits 220, 221 connected thereto, the other end of cable 220 being connected to the electric motor 42 and the other end of cable 221 being connected to the housing of switch 191 (Figures 6 and 23).

It will be observed in Figure 23 that the lead wire 207 extends through the junction box 214 and then through the cable 220 to one side of the electric motor 42 and the other side of the electric motor 42 has a wire or conductor 222 connected thereto, extending through the cable 220 and into the junction box 214. The cable 221 has a pair of wires or conductors 223, 224 therein, corresponding ends of which are connected to opposite sides of the switch 191 and the other ends of which enter the junction box 214.

Referring to Figure 23 it will be observed that the junction box 214 has a transformer 225 and a relay 226 therein and opposite ends of the primary of the transformer 225 are connected to the respective wires 207, 215 by means of branch wires 227, 228. The relay 226 is shown in the form of a solenoid-operated relay having a pair of normally open switches *a*, *b* which are connected to the core of a solenoid *c*. The end of wire 223 remote from switch 191 is connected to one side of the secondary of transformer 225 and the other side of said secondary has a wire or conductor 230 leading therefrom to one side of the coil of the solenoid *c*.

The end of wire 216 remote from switch 204 is connected to the other end of said solenoid coil. A wire or conductor 231 is connected to one side of switch *a* of relay 226 and the other end of wire 231 is connected intermediate the ends of wire 216. The other side of switch *a* has the end of wire 224 remote from switch 191 connected thereto. It will be noted that corresponding ends of wires 215, 222 are connected to opposite sides of the switch *b* of the relay 226 and the end of wire 217 remote from switch 204 is connected intermediate the ends of wire 224.

*Brief summary of operation*

As the welt W of each successive article A is placed about the nose member 20 and about the free end of the hose receiving member 10 by the operator, the operator moves the switch operating finger 200 in a clockwise direction in Figures 1 and 16 to close the normally open switch 204. Assuming plug 210 to be connected to a source of electrical energy, that master switch 205 is closed and that switch 191 is closed, it is apparent that, upon closing switch 204, current flows from one side of the secondary of transformer 205 through wire 223, switch 191, wires 224, 217, switch 204, wire 216, solenoid *c* and wire 230 to the other side of the secondary of transformer 225 thereby energizing solenoid *c* to close switches *a*, *b* in junction box 214.

It is apparent that current will then flow through the electric motor 42 and, although the switch 204 is only closed momentarily by the operator, since switch *a* of relay 226 is closed, it is apparent that the coil of solenoid *c* of relay 226 remains energized until switch 191 is subsequently opened in the manner heretofore described. Upon energization of the electric motor 42, rotation is imparted to the sprocket chains 15, 25 in a clockwise direction in Figures 6 and 16 to 21, inclusive, so that movement is imparted to both of the carriages 13, 22 simultaneously. However, at this time, carriage 22 is disposed closely adjacent the rearmost portion of sprocket chain 25 and carriage 15 is disposed closely adjacent the foremost portion of sprocket chain 15, substantially as shown in Figure 16.

The carriage 13 and hose donning device then move about the free end of the cam 112, whereupon the hose donning device moves into engagement with and draws the hose onto the hose receiving member 10. Upon traversing a predetermined length of the hose receiving member 10, the hose donning device 12 releases the hose therefrom in the manner heretofore described as the latch 145 (Figures 7 and 16 to 21, inclusive) imparts rearward movement to the toe punching device 16. At this time the grippers 26, 27 on the hose doffing and everting device 22 move inwardly and clamp the toe T of the hose A therebetween. A reverse, rearward or active stroke is then imparted to the hose doffing and everting device in the manner heretofore described to draw the hose through the aperture 17 (Figure 13) in the cap 20 as shown in Figure 20. Of course, immediately after, or a relatively short period after, the toe T of the hose A has been clamped between the jaws 26, 27 of the hose doffing and everting device 22, the latch 145 releases the toe punching device 16 so it returns to the position shown in Figures 16, 17, 18, 20 and 21.

It has already been described how the abutment 193 engages the rear end of the jaw shifting bar 166 to cause the jaws 26, 27 to move apart from each other to release the toe of the hose therefrom as the hose doffing and everting device 22 approaches the end of its rearward stroke. As heretofore stated, the projection 187 on the top plate 160 of the hose doffing and everting device 22 also engages the plunger 190 of switch 191 as the doffing and everting device 22 approaches the end of its rearward stroke to thereby open switch 191 and to thereby break the circuit to the coil of solenoid *c* of relay 226 (Figure 23) to thereby stop the flow of current to the electric motor 42.

Due to the momentum of the armature of the electric motor 42 and other parts connected thereto, the chains 15, 25 continue to move for a relatively short period after the electric motor 42 has been de-energized so the projection 187 on the plate 160 of the doffing and everting device 22 moves out of engagement with the plunger 190 of switch 191 to thereby permit the switch 191 to close preparatory to a succeeding cycle in the operation of the apparatus.

As toe T of each successive hose A is released by the grippers or jaws 26, 27, the then completely everted hose falls downwardly in its natural elongated state into the container 37 disposed beneath the hose receiving member 10 to thereby complete a cycle in the operation of the improved hosiery everting apparatus.

In the drawings and specification there has been set forth a preferred embodiment of the invention and, although specific terms are employed, they are used in a generic and descriptive sense only and not for purposes of limitation, the scope of the invention being defined in the claims.

I claim:

1. Hosiery everting apparatus comprising an elongated, hollow and substantially horizontally disposed hose receiving member having a longitudinally extending groove in its lower portion and about one end of which the open end of each successive hose is placed, a first endless pliable element forming laterally spaced substantially parallel runs extending in spaced substantially parallel relation to said receiving member, a second endless pliable element also forming laterally spaced substantially parallel runs extending longitudinally within said receiving member, means for driving said first and second pliable elements, means carried by said first pliable element for grasping and imparting movement to the hose longitudinally of said receiving member, means to release the hose from said means for grasping the same upon a predetermined length of said hose being drawn onto said receiving member, a nose member on said end of said receiving member and having an aperture therethrough communicating with said groove, means to force a portion of said hose through said aperture, an everting device mounted for longitudinal movement in said hollow receiving member and being driven by said second pliable element, gripping means on said everting device for gripping the portion of said hose forced through said aperture and moving the same longitudinally in the hose receiving member to withdraw the hose from the receiving member while everting the same as it is drawn through said aperture, and means for releasing said hose from said gripping means.

2. A structure according to claim 1 wherein said means to force a portion of the hose through the aperture comprises a punching element normally spaced from said nose member and alined with said aperture, a laterally extending arm connected to the punching element, a shaft mounted for longitudinal movement on a fixed portion of said apparatus and extending substantially parallel to said receiving member and parallel to one of the runs of said first pliable element, said laterally extending arm being connected to said shaft, spring means urging said punching element to normal position, an abutment fixed on said shaft, a pivoted latch carried by said first pliable element and depending into the horizontal plane of said abutment, and a restraining plate spaced above said shaft for momentarily restraining said pivoted latch from rotation as it engages and imparts movement to said abutment and, accordingly, to said punching element to move the latter into said aperture whereby, upon said latch moving out of engagement with the restraining plate, said spring means will cause the abutment to rock said latch and cause the punching element to return to normal position.

3. An improved hosiery everting apparatus comprising an elongated hollow and substantially horizontally disposed hose receiving member, about one end of which the open end of each successive hose is placed, said receiving member having a longitudinally extending groove in its lower portion, means for grasping and imparting movement to the hose longitudinally of said receiving member comprising a driven endless pliable element disposed adjacent and to one side of said receiving member, a hose donning carriage carried by said pliable element, an arm pivotally mounted on said donning carriage and having a presser foot thereon adapted to overlie said receiving member with each active stroke imparted thereto by the pliable element, means to hold said presser foot in spaced relation above the level of the receiving member at the initiation of each active stroke thereof, means operable automatically to lower said presser foot to press the hose against said receiving member at a predetermined time after initiation of each active stroke thereof, means operable automatically to raise said presser foot out of engagement with said hose upon a given length of the hose being drawn onto said receiving member, a nose member on said end of the receiving member and having an aperture therein communicating with said groove, means to force a portion of said hose through said aperture, means to grip said portion of said hose and move the same longitudinally of the receiving member to thereby evert the hose as it is drawn through said aperture, and means to release said hose from said gripping means.

4. Hosiery everting apparatus comprising an elongated, hollow and substantially horizontally disposed hose receiving member having a longitudinally extending groove in its lower portion and about whose front end the open end of each successive hose is placed, a first endless sprocket chain forming laterally spaced substantially parallel runs extending in spaced substantially parallel relation to said receiving member, a second endless sprocket chain forming laterally spaced substantially parallel runs extending longitudinally within said receiving member, means for driving said first and second sprocket chains, means carried by said first sprocket chain for grasping and imparting rearward movement to the hose longitudinally of said receiving member, means to release the hose from said means for grasping the same upon a predetermined length of said hose being drawn onto said receiving member, a nose member on said front end of said receiving member and having an aperture therethrough communicating with said groove, means to force a portion of said hose through said aperture, an everting device mounted for reciprocatory longitudinal movement in said hollow receiving member and being driven by said second sprocket chain, gripping means on said everting device for gripping the portion of said hose forced through said aperture and moving the same rearwardly in the hose receiving member to withdraw the hose from the receiving member while everting the same as it is drawn through said aperture, and means for releasing said hose from said gripping means.

5. A structure according to claim 4 wherein said everting device comprises an elongated body, a plate on said body having a transverse slot therein, a pin projecting downwardly from said second sprocket chain and into said transverse slot whereby the second sprocket chain imparts reciprocatory movement to said everting device, a shifting element mounted for longitudinal movement in said body and having a projection thereon disposed adjacent the front end of said plate, a spring-pressed latch projecting forwardly from said plate and normally engaging the rear surface of said projection, resilient means normally urging said shifting element rearwardly relative to said body, said gripping means comprising a pair of jaws each having a rearwardly extending arm thereon, said shifting element having a transverse groove adjacent its front end, a pair of pointed cams pivotally mounted on said body astraddle said shifting element and having their pointed portions engaging said transverse groove and to which the rear ends of the respective arms are secured, means to move said latch above said projection as the body approaches said nose member whereby the resilient means will cause said jaws to close, and means to engage said shifting element to return the jaws to open position upon said body moving rearwardly a predetermined distance.

6. In a hose turning machine having an elongated substantially horizontally disposed member provided with a free end adapted to have the open of a hose placed thereabout, said elongated member being of tubular construction and having an axial opening in said free end thereof and also having a longitudinally extending slot in the lower portion thereof; the combination of a first endless pliable element forming horizontally spaced substantially parallel runs disposed in spaced substantially parallel relation to said elongated member, an elongated track assembly disposed adjacent and extending parallel to said first endless pliable element, a donning carriage mounted for reciprocatory movement on said track assembly, a connection between said pliable element and said donning carriage, a donning device carried by said carriage and having a presser foot thereon adapted to traverse the upper surface of said elongated member with each active stroke of said donning carriage away from the free end of the elongated member, said presser foot normally being spaced above the level of the upper surface of said elongated member, an everting device mounted for longitudinal movement in said elongated member, a second endless pliable element also forming laterally spaced substantially parallel runs extending longitudinally of said elongated member, a mechanical connection between the second pliable element and the everting device for imparting reciprocatory movement to said everting device, means for driving said first and second pliable elements, means to cause the presser foot to press the hose against said elongated member and to slide the hose onto said member, means to release the hose from the presser foot, means to punch the toe of the hose into said opening in the free end of the elongated member, means on the everting device for gripping the portion of the toe punched into said opening whereby the everting device draws the hose longitudinally within said member to evert the same, and means to release the hose from the everting device.

7. Apparatus for everting pliable tubular articles, such as hosiery and the like, comprising a frame, a substantially horizontally disposed elongated member fixed at one end thereof to said frame and its other end being free, the lower surface of said elongated member having a longitudinally extending groove therein, a nose member on the free end of said elongated member and having an aperture therein coinciding with said groove, an endless pliable element forming laterally spaced substantially parallel runs extending longitudinally within said groove, a doffing and everting device mounted for longitudinal movement in said groove, means for driving said pliable element, means on said pliable element for imparting reciprocatory movement to said doffing and everting device longitudinally of said groove, a donning device having a presser foot thereon normally spaced above the level of the upper surface of the elongated member, means for imparting reciprocatory movement to said donning device parallel to said elongated member, means operable automatically upon movement of said donning device toward the fixed end of said elongated member for lowering the presser foot into engagement with the upper surface of the elongated member whereby further movement of the donning device causes an article previously positioned about the free end of said elongated member to be gripped between the presser foot and the elongated member and drawn onto the elongated member, means operable automatically upon movement of said presser foot a predetermined distance away from the free end of said elongated member for raising said presser foot out of engagement with said article, means operable automatically for inserting a portion of the trailing end of said article through said aperture, a pair of normally open jaws carried by said doffing and everting device and being adapted to move into position adjacent said aperture at substantially the time said portion of said article is inserted through said aperture, means operable automatically for then closing said jaws to grip said portion of said article therebetween whereby said article is subsequently drawn through said aperture by the doffing and everting device, and means operable automatically upon said doffing and everting device moving a predetermined distance away from said aperture for opening said jaws to release the article therefrom.

8. A structure according to claim 7 wherein said everting device comprises an elongated body, a plate on said body having a transverse slot therein, a pin projecting downwardly from said pliable element and into said transverse slot whereby the pliable element imparts reciprocatory movement to said everting device, a shifting element mounted for longitudinal movement in said body and having a projection thereon disposed adjacent the end of said plate nearest said free end of said receiving member, a latch projecting from said plate and normally engaging the surface of said projection furthest from said free end, a resilient means normally urging said shifting element away from said free end relative to said body, said jaws each having an arm thereon, said shifting element having a transverse groove therein adjacent its end nearest said free end, a pair of pointed cams pivotally mounted on said body astraddle said shifting element and having their pointed ends engaging said transverse groove and to which the ends of the respective arms remote from the jaws are secured, means to move said latch above said projection as the body approaches said nose member whereby the resilient means will cause said jaws to close, and means to engage said shifting element to return the jaws to open position upon said body moving a predetermined distance away from said free end of said receiving member.

9. In a hose turning machine having an elongated substantially horizontally disposed member provided with a free front end adapted to have the open end of a hose placed thereabout, said elongated member being of tubular construction and having an axial opening in said free end thereof and also having a longitudinally extending slot in the lower portion thereof; the combination of a first endless pliable element forming horizontally spaced substantially parallel runs disposed in spaced substantially parallel relation to said elongated member, an elongated track assembly disposed adjacent and extending parallel to said first endless pliable element, a donning carriage mounted for reciprocatory movement on said track assembly, a connection between said pliable element and said donning carriage, a bell crank pivotally mounted on said carriage and having substantially horizontal and vertical arms thereon, a presser foot on said horizontal arm adapted to traverse the upper surface of said elongated member with each rearward stroke of said donning carriage, spring means urging said horizontal arm downwardly, a first cam engageable by said vertical arm at the initiation of each rearward stroke of the donning carriage for momentarily raising said presser foot above the level of the upper surface of said elongated member and to then permit said spring means to press the presser foot against said hose on the elongated member, an everting device mounted for longitudinal movement in said elongated member, a second endless pliable element also forming laterally spaced substantially parallel runs extending longitudinally of said elongated member, a mechanical connection between the second pliable element and the everting device for imparting reciprocatory movement to said everting device, means for driving said first and second pliable elements, a second cam engageable by said vertical arm to momentarily raise the presser foot upon a predetermined length of the hose being drawn onto said elongated member to release the hose from the presser foot, means to punch the toe of the hose into said opening in the free end of the elongated member, means on the everting device for gripping the portion of the toe punched into said opening whereby the everting device draws the hose longitudinally within said elongated member to evert the same, and means to release the hose from the everting device.

10. In a hose turning machine having an elongated substantially horizontally disposed member having a free front end adapted to have the open end of a hose placed thereabout, said elongated member having an axial opening in said free end thereof and also having a longitudinally extending slot in the lower portion thereof; the combination of a first endless sprocket chain forming horizontally spaced substantially parallel runs disposed in spaced substantially parallel relation to said elongated member, an elongated track assembly disposed adjacent and extending parallel to said first chain, a donning carriage mounted for reciprocatory movement on said track assembly, a connection between said chain and said donning carriage, a donning device carried by said carriage and having a presser foot thereon adapted to traverse the upper surface of said elongated member with each rearward stroke of said donning carriage, said presser foot normally being spaced above the level of the upper surface of said elongated member, an everting device mounted for longitudinal movement in said elongated member, a second endless sprocket chain also forming laterally spaced runs extending longitudinally in said elongated member, a mechanical connection between the second chain and the everting device for imparting reciprocatory movement to said everting device, means for driving said first and second chains, means to cause the presser foot to press the hose against said elongated member and to slide the hose onto said member, means to release the hose from the presser foot, means to punch the toe of the hose into said opening in the free end of the elongated member, means on the everting device for gripping the portion of the toe punched into said opening whereby the everting device draws the hose longitudinally of the groove in said member to evert the same, and means to release the hose from the everting device.

11. Hosiery everting apparatus comprising an elongated, substantially horizontally disposed hose receiving member having a longitudinally extending groove in its lower portion and about one end of which the open end of each successive hose is placed, a first endless sprocket chain forming laterally spaced substantially parallel runs extending in spaced substantially parallel relation to said receiving member, a second endless sprocket chain forming laterally spaced substantially parallel runs extending longitudinally within said groove in said receiving member, means for driving said first and second sprocket chains, means carried by said first sprocket chain for grasping and imparting movement to the hose longitudinally of said receiving member, means to release the hose from said last-named means upon a predetermined length of said hose being drawn onto said receiving member, a nose member on said end of said receiving member and having an aperture therethrough communicating with said groove, means to force a portion of said hose through said aperture, an everting device mounted for longitudinal movement in said groove in the receiving member and being driven by said second sprocket chain, gripping means on said everting device for gripping the portion of said hose forced through said aperture and moving the same longitudinally in the hose receiving member to withdraw the hose from the receiving member while everting the same as it is drawn through said aperture, and means for releasing said hose from said gripping means.

References Cited in the file of this patent

UNITED STATES PATENTS 1,955,401 Ahnger ---------------- Apr. 17, 1934